(12) United States Patent
Haruna et al.

(10) Patent No.: US 7,805,490 B2
(45) Date of Patent: Sep. 28, 2010

(54) DELETING MECHANISM IN SIP MULTIMEDIA SERVICES

(75) Inventors: Adamu Haruna, Tampere (FI); Arto Leppisaari, Kangasala (FI)

(73) Assignee: Nokia Corporation, Espoo (FI)

(*) Notice: Subject to any disclaimer, the term of this patent is extended or adjusted under 35 U.S.C. 154(b) by 520 days.

(21) Appl. No.: 11/696,074

(22) Filed: Apr. 3, 2007

(65) Prior Publication Data

US 2007/0233682 A1 Oct. 4, 2007

Related U.S. Application Data

(60) Provisional application No. 60/788,647, filed on Apr. 3, 2006.

(51) Int. Cl.
G06F 15/16 (2006.01)
H04L 12/66 (2006.01)
H04J 3/06 (2006.01)

(52) U.S. Cl. .................. 709/206; 709/227; 370/352; 370/503

(58) Field of Classification Search .................. None
See application file for complete search history.

(56) References Cited

U.S. PATENT DOCUMENTS

| | | | |
|---|---|---|---|
| 6,611,836 B2* | 8/2003 | Davis et al. ................. 707/10 |
| 2001/0029524 A1 | 10/2001 | Smith et al. | |
| 2002/0169887 A1* | 11/2002 | MeLampy et al. .......... 709/231 |
| 2005/0055416 A1 | 3/2005 | Heikes et al. | |
| 2005/0267942 A1* | 12/2005 | Quinn et al. ................ 709/206 |
| 2006/0026288 A1 | 2/2006 | Acharya et al. | |
| 2006/0168467 A1* | 7/2006 | Couturier et al. ............... 714/4 |
| 2007/0078935 A1* | 4/2007 | Garcia-Martin et al. ..... 709/206 |

FOREIGN PATENT DOCUMENTS

| | | |
|---|---|---|
| EP | 1372316 | 12/2003 |
| KR | 2006084327 | * 7/2006 |
| WO | WO 2005/121991 | 12/2005 |
| WO | WO 2007/105074 | 9/2007 |

OTHER PUBLICATIONS

Jennings et al., Relay Extensions for Message Sessions Relay Protocol (MSRP) draft-ietf-simple-msrp-relays-02.txt, Oct. 2004.*
Sparks, "RFC 3515", Apr. 2003.*

(Continued)

*Primary Examiner*—Wen-Tai Lin
(74) *Attorney, Agent, or Firm*—Ditthavong Mori & Steiner, P.C.

(57) ABSTRACT

A method of deleting an item from a user account in a SIP multimedia environment. When an item such as an instant message is to be deleted, a SIP REFER message is transmitted from a user device to delete the item from the user account, with the message including a unique identifier for the item. In response to the transmitted request, an SIP INVITE session is established between a virtual agent and a network-based deleted items location. After the SIP INVITE session is established, the item is transferred from the user account to the network-based deleted items location and is deleted from the user account.

46 Claims, 10 Drawing Sheets

OTHER PUBLICATIONS

Sparks, The Session initiation protocol (SIP) refer method. Network Working Group, Request for Comments: 3515, Category: Standards Track, p. 1-23, Apr. 2003.

Campbell et al., Session initiation protocol (SIP) extension for instant messaging. Network Working Group, Request for Comments: 3428, Category: Standards Track, p. 1-16, Dec. 2002.

"Request to delete history." Doc# OMA-TS-IM_SIMPLE-V1_0-20061002-D.doc, p. 1-3, Oct. 13, 2006.

"Deleting stored messages." Request Change, Doc# OMA-TS-IM_SIMPLE-V1_0_0-20060109D, p. 1, Apr. 4, 2006.

International Search Report for PCT Application No. PCT/IB2007/051193.

Schulzrinne et al. "Application-Layer Mobility using SIP," Mobile Computing and Communications Review (MC2R), vol. 4, #3, Jul. 2000.

Australian Office Action of corresponding AU App. No. 2007232195 dated May 17, 2010, pp. 1-2.

Office Action of related U.S. Appl. No. 11/685,667 dated Jun. 11, 2010, pp. 1-17.

* cited by examiner

DELETING MECHANISM IN SIP MULTIMEDIA SERVICES

CROSS-REFERENCE TO RELATED APPLICATIONS

The present application claims priority to U.S. Provisional Patent Application No. 60/788,647 ("the '647 application"), filed Apr. 3, 2006, which is incorporated herein by reference.

FIELD OF THE INVENTION

The present invention relates generally to session initiation protocol (SIP) services and SIP for instant messaging and presence leveraging extensions (SIMPLE) services. More particularly, the present invention relates to SIP/SIMPLE based services such as instant messaging (IM) and push-to-talk (PoC) services.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Open Mobile Alliance (OMA) is a standards body which collectively develops open standards for use in the mobile industry. The OMA helps to create interoperable services enablers to work across countries, operators and mobile terminals and is driven by market requirements. To expand the mobile market, companies supporting the Open Mobile Alliance work to aid in the rapid and wide development and deployment of a variety of new, enhanced mobile information, communication and entertainment services.

The OMA is currently developing IM services based on SIP, Message Session Relay Protocol (MSRP) and Extensible Markup Language (XML) Configuration Access Protocol (XCAP) protocols developed by the International Engineering Task Force (IETF) SIMPLE working group. Instant Messaging service are already deployed using several proprietary technologies and Wireless Village specifications.

There is currently a need for a deleting Mechanism in the SIP multimedia service environment. In an http environment, if a document needs to be deleted, an "http delete" command is simply issued. However, there is currently no corresponding deleting feature or function defined for the SIP environment. In fact, even SIP extensions for services have not defined such a feature. In current multimedia services, particularly OMA SIP/SIMPLE IM, there are several requirements about storing and retrieving messages. Although there is a need for deleting and selectively deleting stored messages, such a mechanism has yet to be defined.

SUMMARY OF THE INVENTION

The present invention comprises a novel deleting mechanism for use in SIP multimedia services. The present invention involves the use of various SIP multimedia service environment features for this purpose. In one embodiment, a "recycle bin" is defined in the network and is associated with a SIP uniform resource identifier. Messages that are stored within the network are assigned a unique identifier. If a user desires to delete the message, he or she requests that a SIP/ MSRP function be set up between the message and the network-defined recycle bin. When processed, the message is transferred to the recycle bin, leaving the user's account in the user's mail storage server.

The system and method of the present invention is simple and easy to adopt, as already-existing defined tools such as the SIP REFER method, Virtual User Agent and SIP URI are used.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention comprises a novel deleting mechanism for use in SIP multimedia services. The present invention involves the use of various SIP multimedia service environment features for this purpose. In one embodiment, a "recycle bin" or similar location for deleted items is defined in the network and is associated with a SIP uniform resource identifier. Messages that are stored within the network are assigned a unique identifier. If a user desires to delete the message, he or she requests that a SIP/MSRP session function be set up between the message and the network-defined recycle bin. When processed, the message is transferred to the recycle bin, leaving the user's account in the user's mail storage server.

Figure 1:
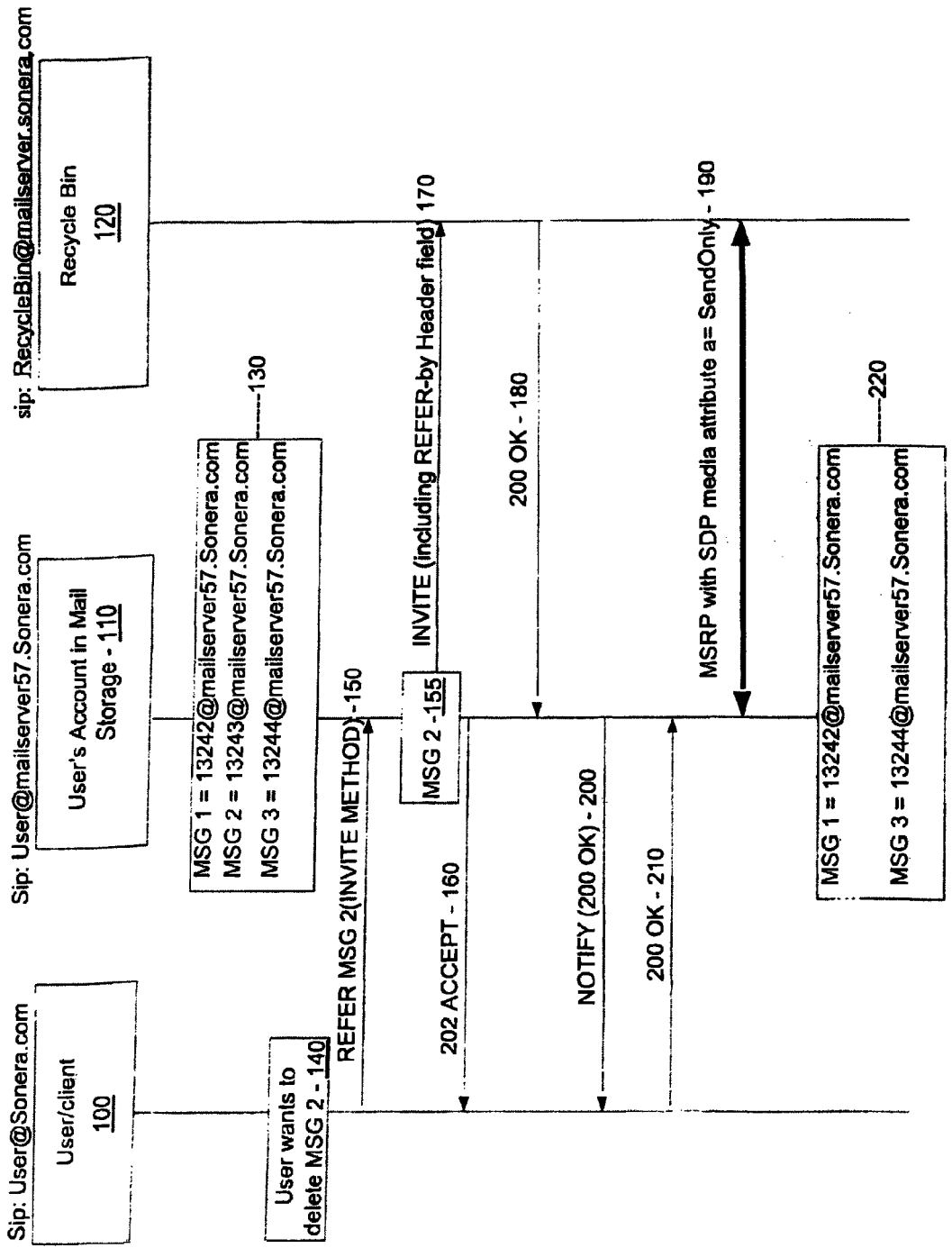
FIG. 1 is a flow chart showing the operation of a deleting mechanism for SIP multimedia services in accordance with one embodiment of the present invention.

FIG. 1 is a flow chart showing the operation of a deleting mechanism for SIP multimedia services in accordance with one embodiment of the present invention. In particular, FIG. 1 shows the interaction among a user/client device 100, a user's account in mail storage 110 and a recycle bin 120 as defined herein. Both the user's account 110 and the recycle bin 120 are located remote from the user/client device. In the embodiment shown in FIG. 1, the SIP URI for the user/client device is "User@Sonera.com." The SIP URI for the user's account is "User@mailserver57.Sonera.com." The SIP URI for the recycle bin is "RecycleBin@mailserver.sonera.com."

As discussed above, stored messages in the network can be assigned unique message identifiers. Three such messages are shown at 130 in FIG. 1 with identifiers of "13242@mailserver57.Sonera.com" (MSG 1) "13243@mailserver57.Sonera.com" (MSG 2) and "13244@mailserver57.Sonera.com" (MSG 3). Alternatively, messages can be stored as files. In one embodiment, each message can be given a file name, a file type, and a hash value. Three such messages are shown in FIG. 2 with identifiers of "File 1=(filename, filetype, unique hash value)", "File 2=(filename, filetype, unique hash value)", and "File 3=(filename, filetype, unique hash value)".

At 140 in FIG. 1, a user decides he or she wants to delete MSG 2. At this point, the user/client device 100 sends an SIP REFER with INVITE request 150 to the message identifier 13243@mailserver57.Sonera.com, which serves as a virtual user agent 155, at the user's account 110. The SIP REFER request has the network-based recycle bin address (RecycleBin@mailserver.sonera.com) in the Refer-to header. The SIP REFER with INVITE request 150 serves to request that a SIP Session be set up with the network-based recycle bin 120 (RecycleBin@mailserver.sonera.com). The virtual user agent 155 responds by accepting the SIP REFER request from the user/client device 100 with a "202 ACCEPT" message at 160. The virtual user agent 155 also sends an INVITE request to set up a SIP session with the recycle bin 120 at 170. The recycle bin 120 accepts this session at 180. At 190, an SIP session is officially set up with the virtual user agent 155 in the form of a message session relay protocol (MSRP), with the session description protocol (SDP) media attribute set to a=SendOnly. The virtual user agent 155 proceeds to notify the user/client 100 of the SIP session at 200, and the user/client device 100 acknowledges this notification at 210. In the SIP/MSRP session, MSG 2 is sent from the user's account 110 to the network-based recycle bin 120, causing MSG 2 to disappear from the user's account 110. After successful transmission of the message MSG2, the SIP session between the virtual user agent 155 and the recycle bin 120 is torn down. The end result, depicted at 220, is the presence of only MSG 1 and MSG 3 in the user's account 110 in the user's mail storage server.

In an alternative embodiment of the present invention, the functions of the user's account 110 and the recycle bin 120 are collocated. In this situation, the sending of an INVITE request to set up a SIP session 170, the acknowledgement of this request 180, and the setting up of the SIP session with MSRP 190 is not necessary.

Figure 2:
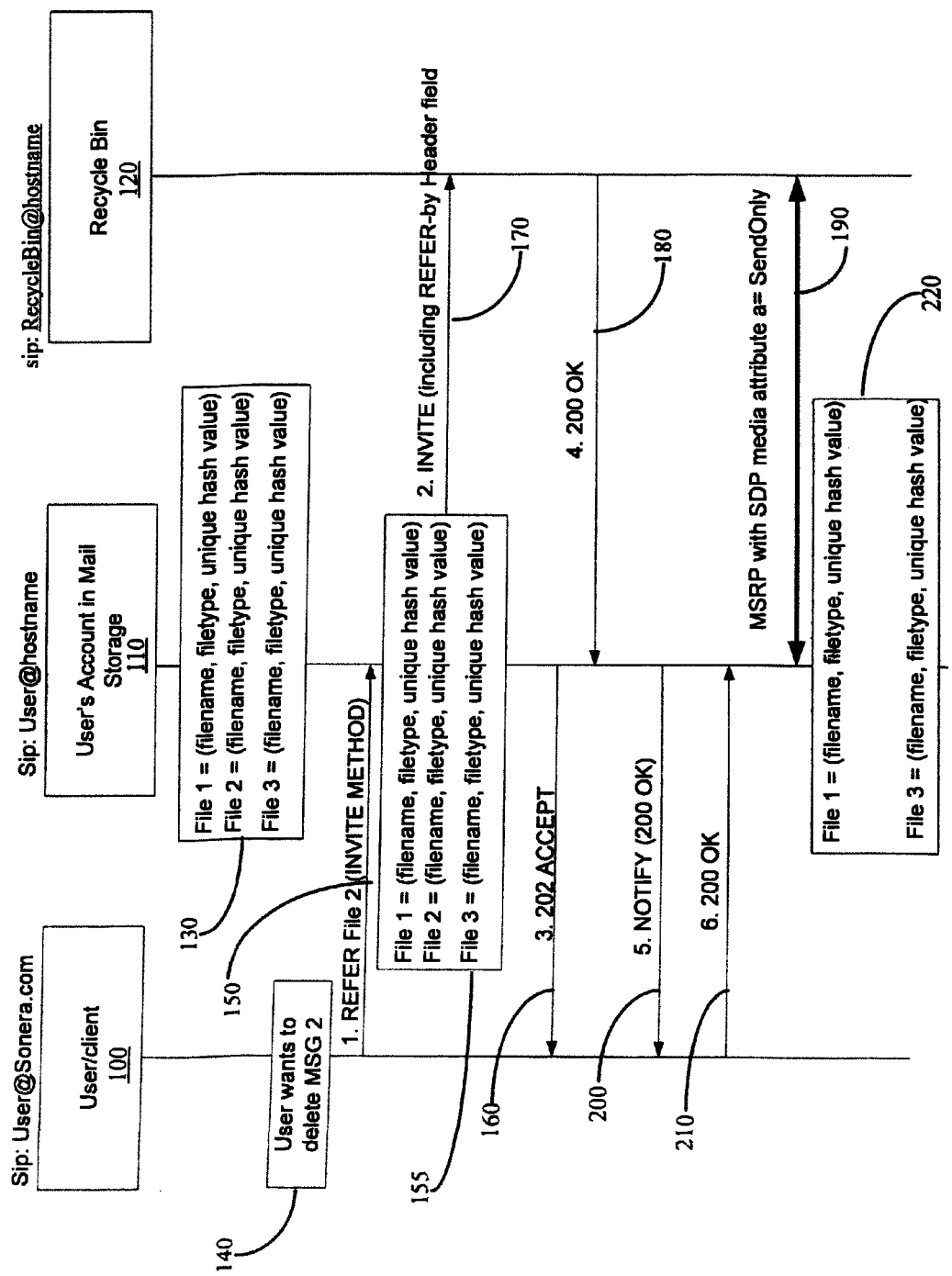
FIG. 2 is a flow chart showing the operation of a deleting mechanism for SIP multimedia services for deleting a selected message in accordance with another embodiment of the present invention.

An alternative embodiment in which the messages are stored as files is illustrated in FIG. 2. In this embodiment the mechanism to retrieve the stored or selected messages to the recycle bin can be based on the file transfer draft described in Exhibit B of the '647 application can be used. In this embodiment, the REFER request can include the SDP descriptions of the file(s) to be deleted.

At 140 in FIG. 2, a user decides he or she wants to delete MSG 2 (File 2). At this point, the user/client device 100 sends an SIP REFER with INVITE request 150 to the mail storage server, which serves as a virtual user agent 155, at the user's account 110. The SIP REFER request has the network-based recycle bin address (RecycleBin@mailserver.sonera.com) in the Refer-to header. The SIP REFER with INVITE request 150 serves to request that a SIP Session be set up with the network-based recycle bin 120 (RecycleBin@mailserver.sonera.com). The virtual user agent 155 responds by accepting the SIP REFER request from the user/client device 100 with a "202 ACCEPT" message at 160. The virtual user agent 155 also sends an INVITE request to set up a SIP session with the recycle bin 120 at 170. The recycle bin 120 accepts this session at 180. At 190, an SIP session is officially set up with the virtual user agent 155 in the form of a message session relay protocol (MSRP), with the session description protocol (SDP) media attribute set to a=SendOnly. The virtual user agent 155 proceeds to notify the user/client 100 of the SIP session at 200, and the user/client device 100 acknowledges this notification at 210. In the SIP/MSRP session, File 2 is sent from the user's account 110 to the network-based recycle bin 120, causing MSG 2 to disappear from the user's account 110. After successful transmission of the file File 2 (MSG2), the SIP session between the virtual user agent 155 and the recycle bin 120 is torn down. The end result, depicted at 220, is the presence of only MSG 1 (File 1) and MSG 3 (File 3) in the user's account 110 in the user's mail storage server.

In an alternative embodiment of the present invention, the functions of the user's account 110 and the recycle bin 120 are collocated. In this situation, the sending of an INVITE request to set up a SIP session 170, the acknowledgement of this request 180, and the setting up of the SIP session with MSRP 190 is not necessary.

Figure 3:
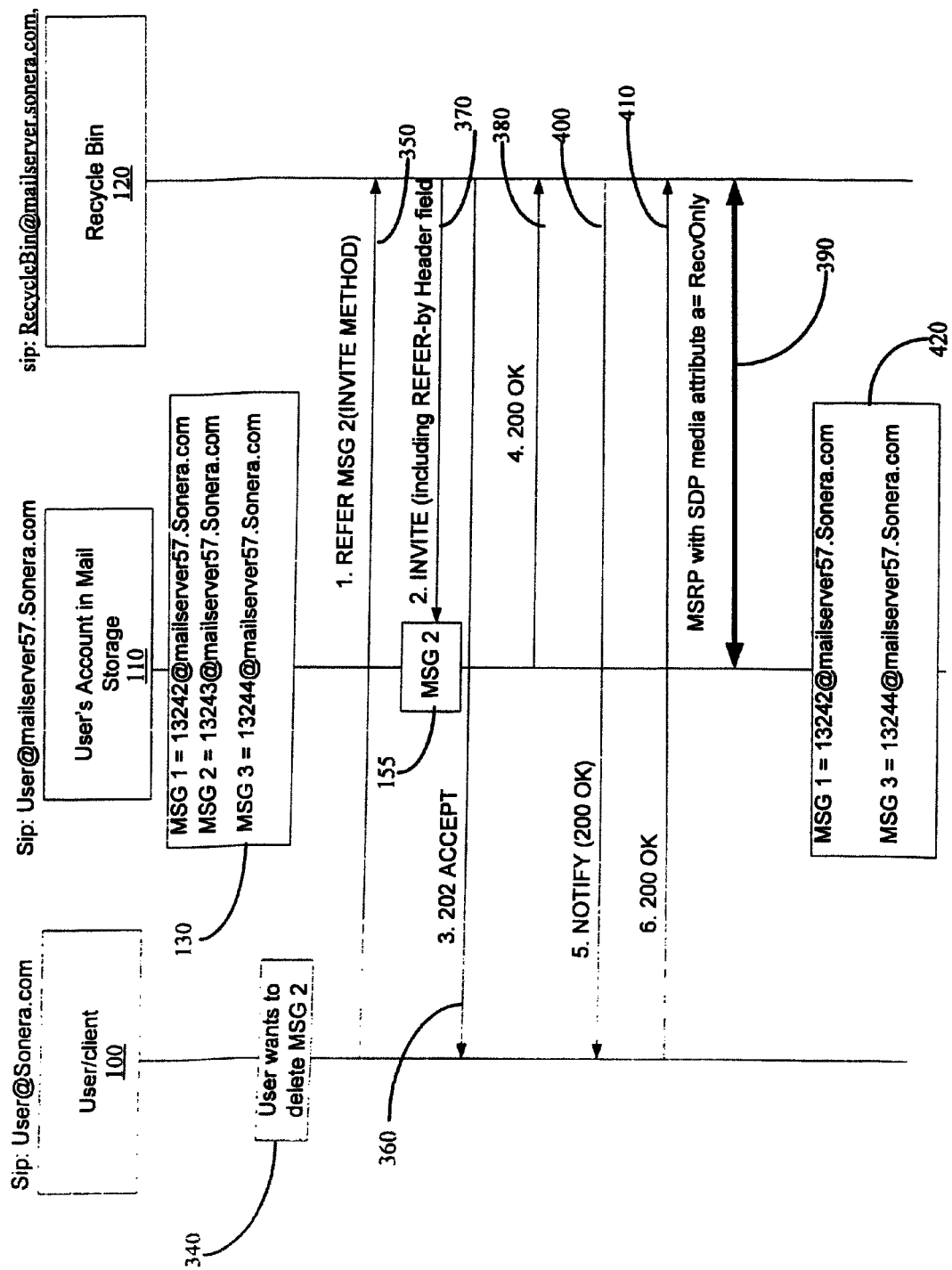
FIG. 3 is a flow chart showing the operation of a deleting mechanism for SIP multimedia services for deleting a selected message in accordance with still another embodiment of the present invention.

An alternative embodiment of the invention is illustrated in FIG. 3. In this embodiment the SIP REFER with INVITE request is sent directly to the network-based recycle bin bypassing the virtual user agent. For example, at 340 in FIG. 3, a user decides he or she wants to delete MSG 2. At this point, the user/client device 100 sends an SIP REFER with INVITE request 350 to the recycle bin 120 (RecycleBin@mailserver.sonera.com). The SIP REFER with INVITE request 350 serves to request that a SIP Session be set up between the network-based recycle bin 120 (RecycleBin@mailserver.sonera.com) and the user's account 110 or the virtual user agent 155 if one is used. The recycle bin 120 responds by accepting the SIP REFER request from the user/client device 100 with a "202 ACCEPT" message at 360. The recycle bin 120 also sends an INVITE request to set up a SIP session with virtual user agent 155 at 370. The virtual user agent 155 accepts this session at 380. At 390, an SIP session is officially set up with the virtual user agent 155 in the form of a message session relay protocol (MSRP), with the session description protocol (SDP) media attribute set to a=RecvOnly. The recycle bin 120 proceeds to notify the user/client 100 of the SIP session at 400, and the user/client device 100 acknowledges this notification at 410. In the SIP/MSRP session, MSG 2 is sent from the user's account 110 to the network-based recycle bin 120, causing MSG 2 to disappear from the user's account 110. After successful transmission of the message MSG2, the SIP session between the virtual user agent 155 and the recycle bin 120 is torn down. The end result, depicted at 420, is the presence of only MSG 1 and MSG 3 in the user's account 110 in the user's mail storage server.

Similar to the earlier embodiment, alternatively the functions of the user's account 110 and the recycle bin 120 are collocated. In this situation, the sending of an INVITE request to set up a SIP session 370, the acknowledgement of this request 380, and the setting up of the SIP session with MSRP 390 is not necessary.

Figure 4:
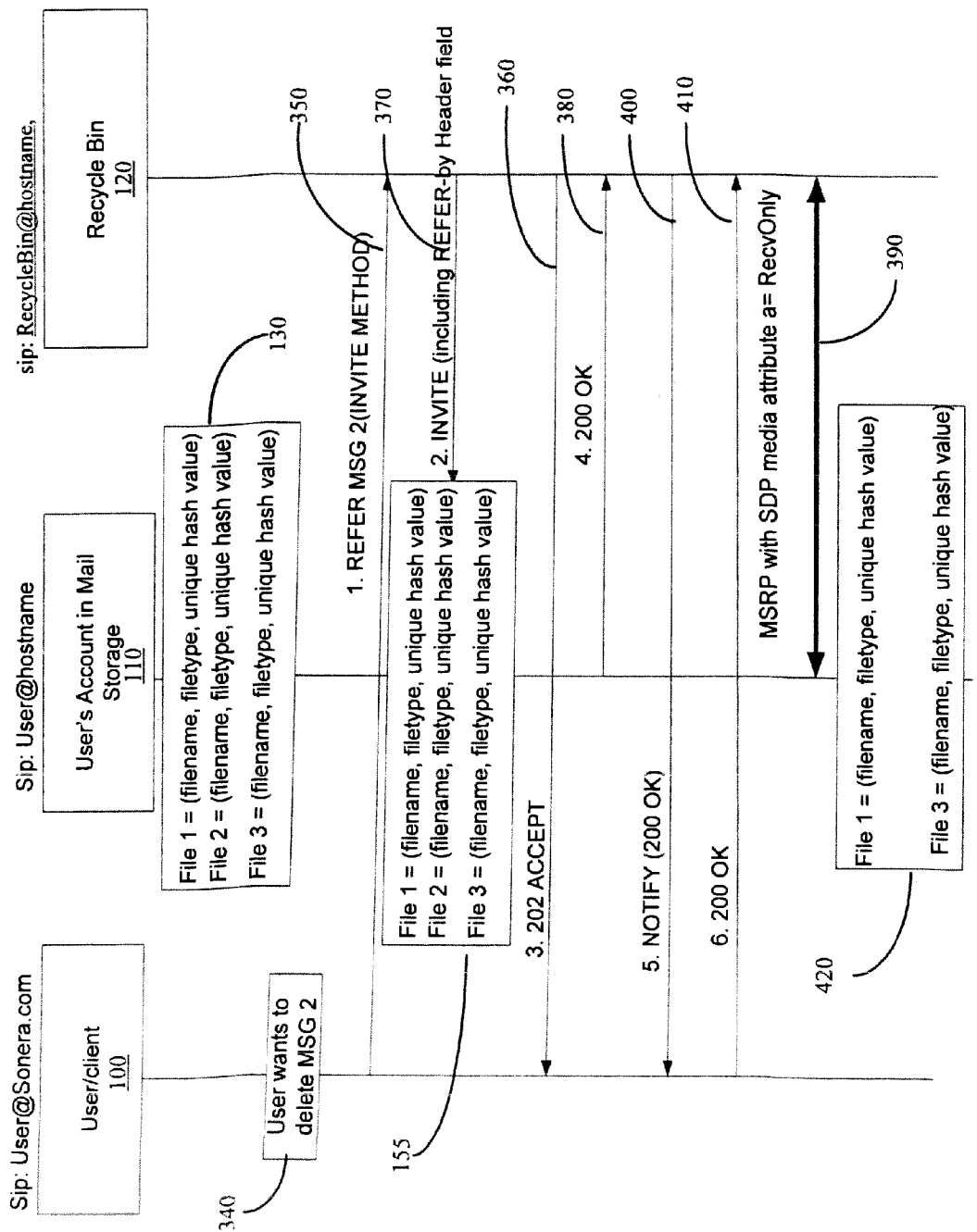
FIG. 4 is a flow chart showing the operation of a deleting mechanism for SIP multimedia services for deleting multiple selected messages in accordance with an embodiment of the present invention.

The embodiment of the invention illustrated in FIG. 4 is an alternative to the embodiment of FIG. 3. Similar to FIG. 3, in this embodiment the SIP REFER with INVITE request is sent directly to the network-based recycle bin bypassing the virtual user agent. However, in the embodiment in FIG. 4, the mechanism to retrieve the stored or selected messages to the recycle bin is based on the file transfer draft attached as Exhibit B in the '647 application. In this embodiment, the REFER request includes the SDP descriptions of the file(s) to be deleted.

At 340 in FIG. 4, a user decides he or she wants to delete MSG 2 (File 2). At this point, the user/client device 100 sends an SIP REFER with INVITE request 350 to the recycle bin 120 (RecycleBin@mailserver.sonera.com). The SIP REFER with INVITE request 350 serves to request that a SIP Session be set up with the network-based recycle bin 120 (RecycleBin@mailserver.sonera.com). The recycle bin 120 responds by accepting the SIP REFER request from the user/client device 100 with a "202 ACCEPT" message at 360. The recycle bin 120 also sends an INVITE request to set up a SIP session with virtual user agent 155 at 370. The virtual user agent 155 accepts this session at 380. At 390, an SIP session is officially set up with the virtual user agent 155 in the form of a message session relay protocol (MSRP), with the session description protocol (SDP) media attribute set to a=RecOnly. The recycle bin 120 proceeds to notify the user/client 100 of the SIP session at 400, and the user/client device 100 acknowledges this notification at 410. In the SIP/MSRP session, File 2 (MSG 2) is sent from the user's account 110 to the network-based recycle bin 120, causing File 2 (MSG 2) to disappear from the user's account 110. After successful transmission of File 2 (MSG2), the SIP session between the virtual user agent 155 and the recycle bin 120 is torn down. The end result, depicted at 420, is the presence of only File 1 (MSG 1) and File 3 (MSG 3) in the user's account 110 in the user's mail storage server.

Similar to the earlier embodiment, alternatively the functions of the user's account 110 and the recycle bin 120 are collocated. In this situation, the sending of an INVITE request to set up a SIP session 370, the acknowledgement of this request 380, and the setting up of the SIP session with MSRP 390 is not necessary.

In another embodiment, multiple stored messages can be selected and deleted by the user. In this embodiment, illustrated in FIG. 5 a Multiple-REFER request can be sent to the recycle bin 120 to delete multiple selected messages. Exhibit A of the '647 application, illustrates one embodiment or implementation of the Multiple-REFER request. In the embodiment shown in FIG. 5, the SIP Multiple-REFER with INVITE request is sent directly to the network-based recycle bin bypassing the virtual user agent. Alternatively, the SIP Multiple-REFER with INVITE request can be sent to the virtual user agent as described with respect to the embodiment illustrated in FIG. 1.

Figure 5:
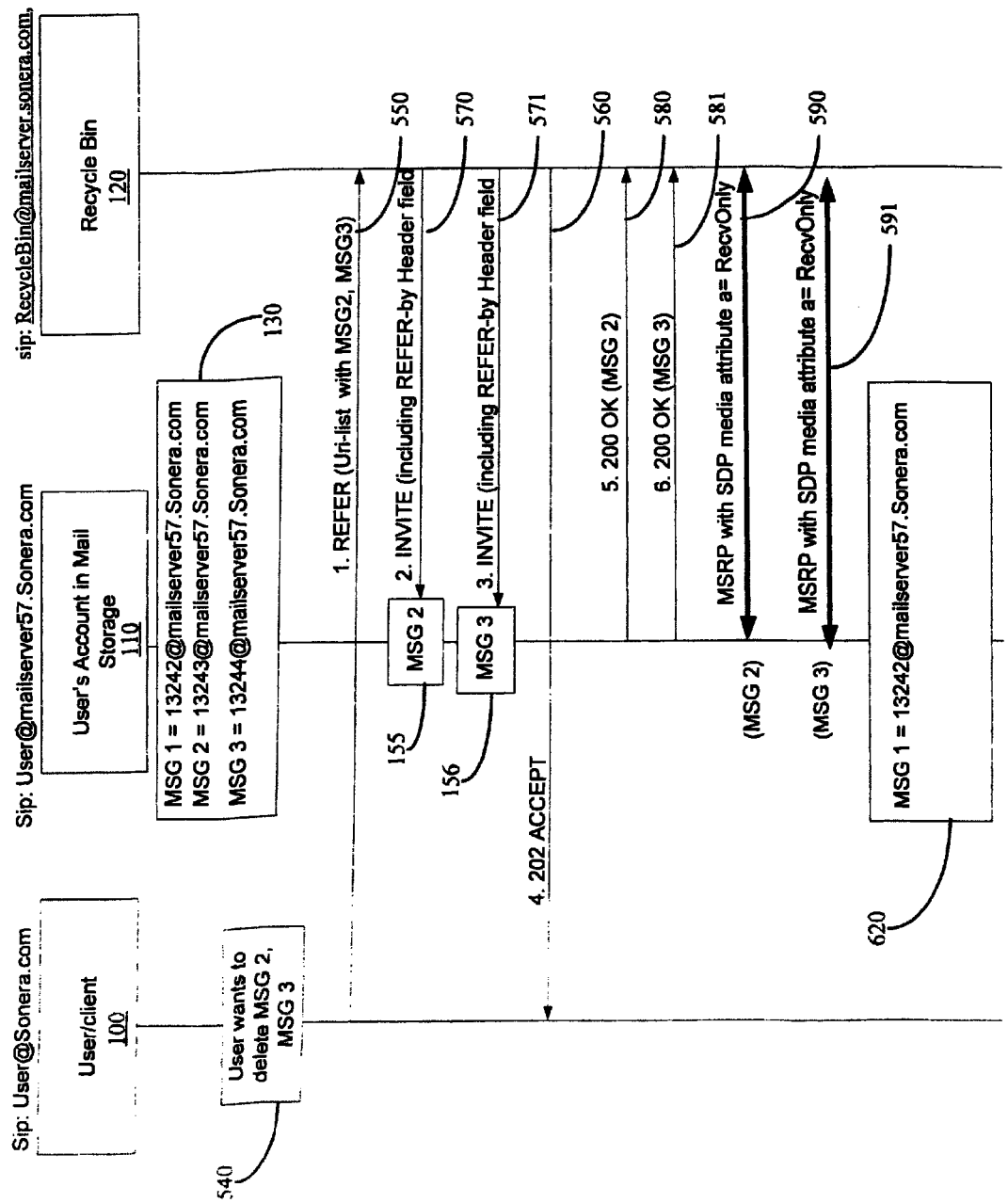
FIG. 5 is a flow chart showing the operation of a deleting mechanism for SIP multimedia services for deleting multiple selected messages in accordance with an embodiment of the present invention.

At 540 in FIG. 5, a user decides he or she wants to delete MSG 2 and MSG 3. At this point, the user/client device 100 sends an SIP Multiple-REFER with INVITE request 550 to the recycle bin 120 (RecycleBin@mailserver.sonera.com) including a URI list containing the URIs of the stored messages to be deleted (in this case MSG 2 and MSG3). The SIP Multiple-REFER with INVITE request 550 serves to request that SIP Sessions be set up with the network-based recycle bin 120 (RecycleBin@mailserver.sonera.com). The recycle bin 120 sends INVITE requests to set up SIP sessions with virtual user agents 155 and 156 at 570 and 571, respectively, one for each message being deleted. In this case, INVITE request 570 corresponds to MSG2 and INVITE request 571 corresponds to MSG3. The virtual user agents 155 and 156 accept these sessions at 580 and 581, respectively. At 590, a SIP session is officially set up with the virtual user agent 155 in the form of a message session relay protocol (MSRP), with the session description protocol (SDP) media attribute set to a=RecvOnly and at 591 a SIP session is set up with virtual user agent 156. In the SIP/MSRP sessions, MSG 2 and MSG3 are sent from the user's account 110 to the network-based recycle bin 120, causing MSG 2 and MSG3 to disappear from the user's account 110. After successful transmission of the messages MSG2 and MSG3, the SIP session between the virtual user agents 155 and 156 and the recycle bin 120 are torn down. The end result, depicted at 620, is the presence of only MSG 1 in the user's account 110 in the user's mail storage server.

Similar to the earlier embodiments, the functions of the user's account 110 and the recycle bin 120 can also be collocated. In this situation, the sending of the INVITE requests to set up a SIP session 570 and 571, the acknowledgements of these requests 580 and 581, and the setting up of the SIP sessions with MSRP 590 and 591 are not necessary.

Figure 6:
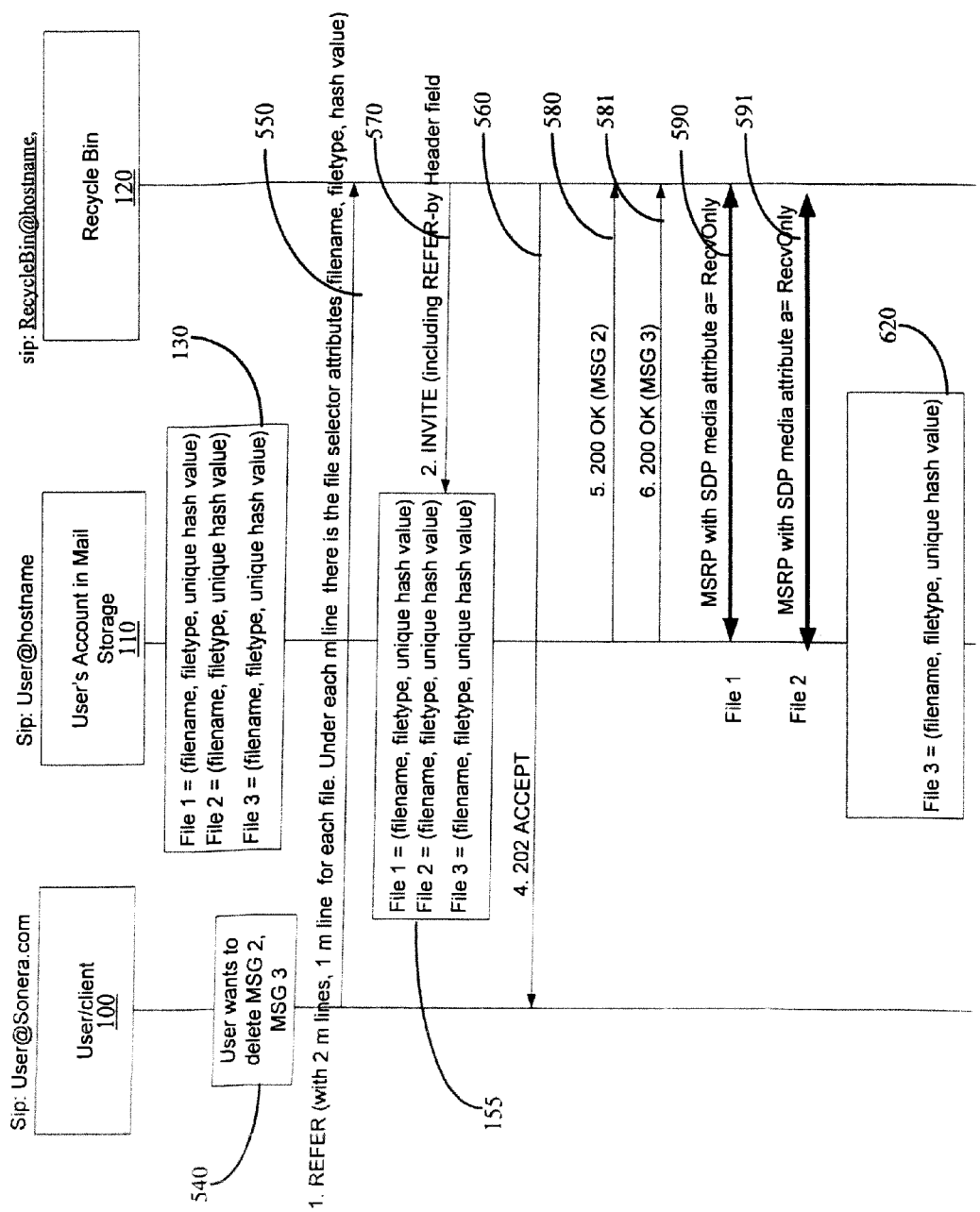
FIG. 6 is a flow chart showing the operation of a deleting mechanism for SIP multimedia services for deleting multiple selected messages in accordance with an embodiment of the present invention.

The embodiment shown in FIG. 6 illustrates deleting multiple messages when the mechanism to retrieve the stored or selected messages to the recycle bin is based on the file transfer draft attached as Exhibit B to the '647 application. In this embodiment, the REFER request again includes the SDP descriptions of the files to be deleted. At 540 in FIG. 6, a user decides he or she wants to delete MSG 2 (File 2) and MSG 3 (File 3). At this point, the user/client device 100 sends an SIP REFER with INVITE request 550 to the recycle bin 120 (RecycleBin@mailserver.sonera.com) using the syntax described in Exhibit B of the '647 application for the stored messages (files) to be deleted (in this case MSG 2 and MSG3). In this case, the SDP parameters for each file (message) that is to be deleted needs to be sent in a separate media line "m=". The SIP REFER with INVITE request 550 serves to request that SIP Sessions be set up between the network-based recycle bin 120 (RecycleBin@mailserver.sonera.com) and the user's account 110 or the virtual user agent 155 if one is used. The recycle bin 120 sends INVITE requests to set up SIP sessions with virtual user agent 155 at 570. The virtual user agent 155 accepts a session for each file to be deleted at 580 and 581, respectively. At 590, a SIP session is officially set up with the virtual user agent 155 in the form of a message session relay protocol (MSRP), with the session description protocol (SDP) media attribute set to a=RecvOnly and at 591 a SIP session is set up with virtual user agent 156. In the SIP/MSRP sessions, File 2 (MSG 2) and File 3 (MSG3) are sent from the user's account 110 to the network-based recycle bin 120, causing MSG 2 (File 2) and MSG3 (File 3) to disappear from the user's account 110. After successful transmission of the files File 2 (MSG 2) and File 3 (MSG3), the SIP sessions between the virtual user agent 155 and the recycle bin 120 are torn down. The end result, depicted at 620, is the presence of only File 1 (MSG 1) in the user's account 110 in the user's mail storage server.

Similar to the earlier embodiments, the functions of the user's account 110 and the recycle bin 120 can also be collocated. In this situation, the sending of the INVITE requests to set up a SIP session 580 and 581, the acknowledgements of these requests 580 and 581, and the setting up of the SIP sessions with MSRP 590 and 591 are not necessary.

In still another embodiment, all stored messages can be selected and deleted by the user. In this embodiment, illustrated in FIG. 7 a REFER request can be sent to the recycle bin 120 to delete all messages by referring the SIP URI for the user's mail storage account instead of an individual message or URI list of messages. Again in the embodiment shown in FIG. 7, the SIP REFER with INVITE request is sent directly to the network-based recycle bin bypassing the virtual user agent. Alternatively, the SIP REFER with INVITE request can be sent to the virtual user agent as described with respect to the embodiment illustrated in FIG. 1.

Figure 7:
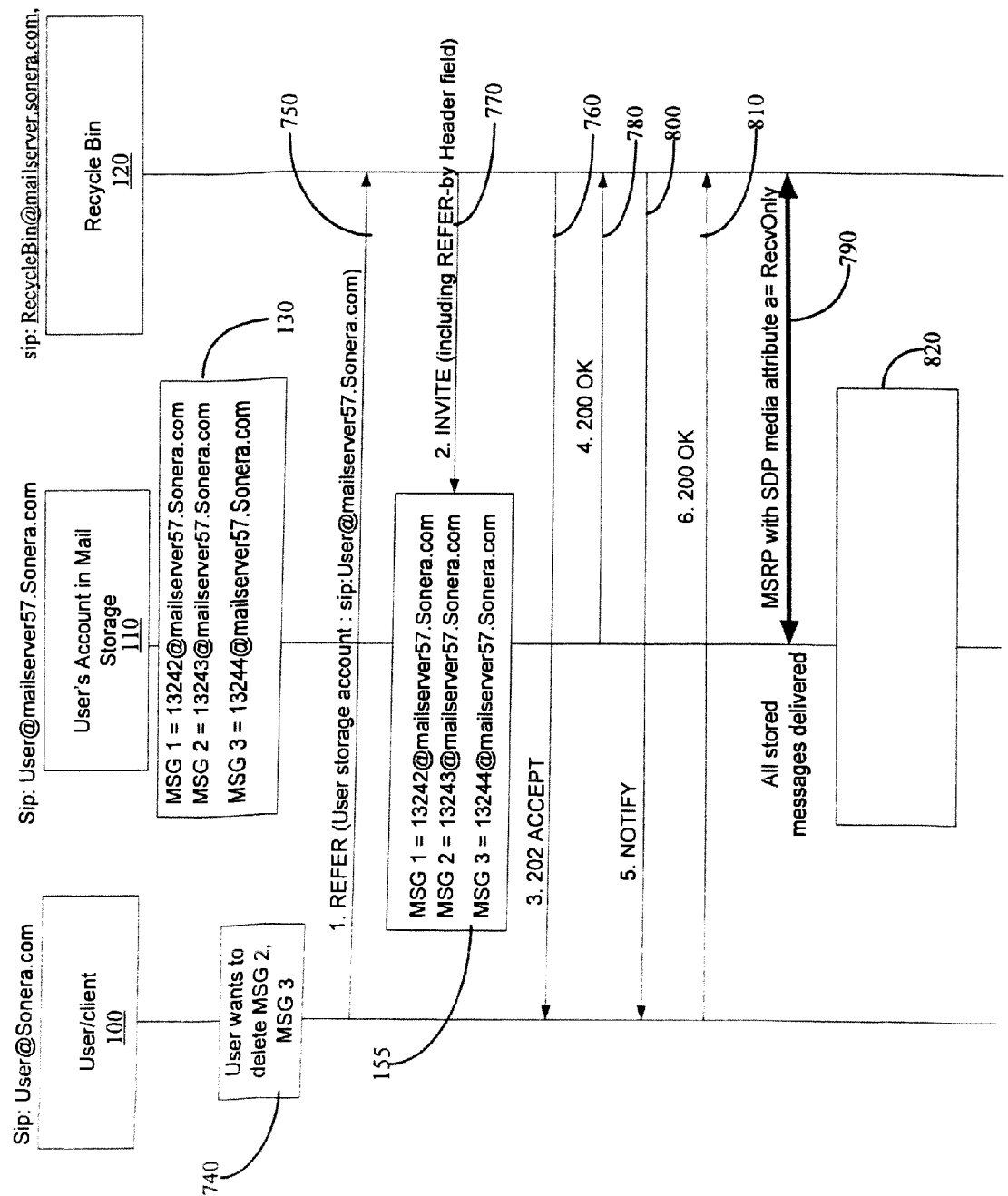
FIG. 7 is a flow chart showing the operation of a deleting mechanism for SIP multimedia services for deleting all messages in a user's mail storage account in accordance with an embodiment of the present invention.

At 740 in FIG. 7, a user decides he or she wants to delete all of the messages in his or her mail storage account. At this point, the user/client device 100 sends an SIP REFER with INVITE request 750 to the recycle bin 120 (RecycleBin@mailserver.sonera.com) including the SIP URI for the user's mail storage account (in this case User@mailserver57.Sonera.com). The SIP REFER with INVITE request 750 serves to request that a SIP Session be set up between the network-based recycle bin 120 (RecycleBin@mailserver.sonera.com) and the user's account 110 or the virtual user agent 155 if one is used. The recycle bin 120 responds by accepting the SIP REFER request from the user/client device 100 with a "202 ACCEPT" messages at 760. The recycle bin 120 also sends an INVITE request to set up a SIP session with virtual user agent 155 at 770. The virtual user agent 155 accepts this session at 780. At 790, a SIP session is officially set up with the virtual user agent 155 in the form of a message session relay protocol (MSRP), with the session description protocol (SDP) media attribute set to a=RecvOnly. The recycle bin 120 proceeds to notify the user/client 100 of the SIP session at 800, and the user/client device 100 acknowledges this notification at 810. In the SIP/MSRP sessions, all messages in the user's mail storage account (MSG1, MSG 2 and MSG3 in this case) are sent from the user's account 110 to the network-based recycle bin 120, causing all messages to disappear from the user's account 110. After successful transmission of the all of the messages from the user's mail storage account, the SIP session between the virtual user agent 155 and the recycle bin 120 is torn down. The end result, depicted at 820, is the no messages left in the user's account 110 in the user's mail storage server.

Similar to the earlier embodiments, the functions of the user's account 110 and the recycle bin 120 can also be collocated. In this situation, the sending of the INVITE requests to set up a SIP session 770, the acknowledgements of the request 780, and the setting up of the SIP session with MSRP 790 is not necessary.

Figure 8:
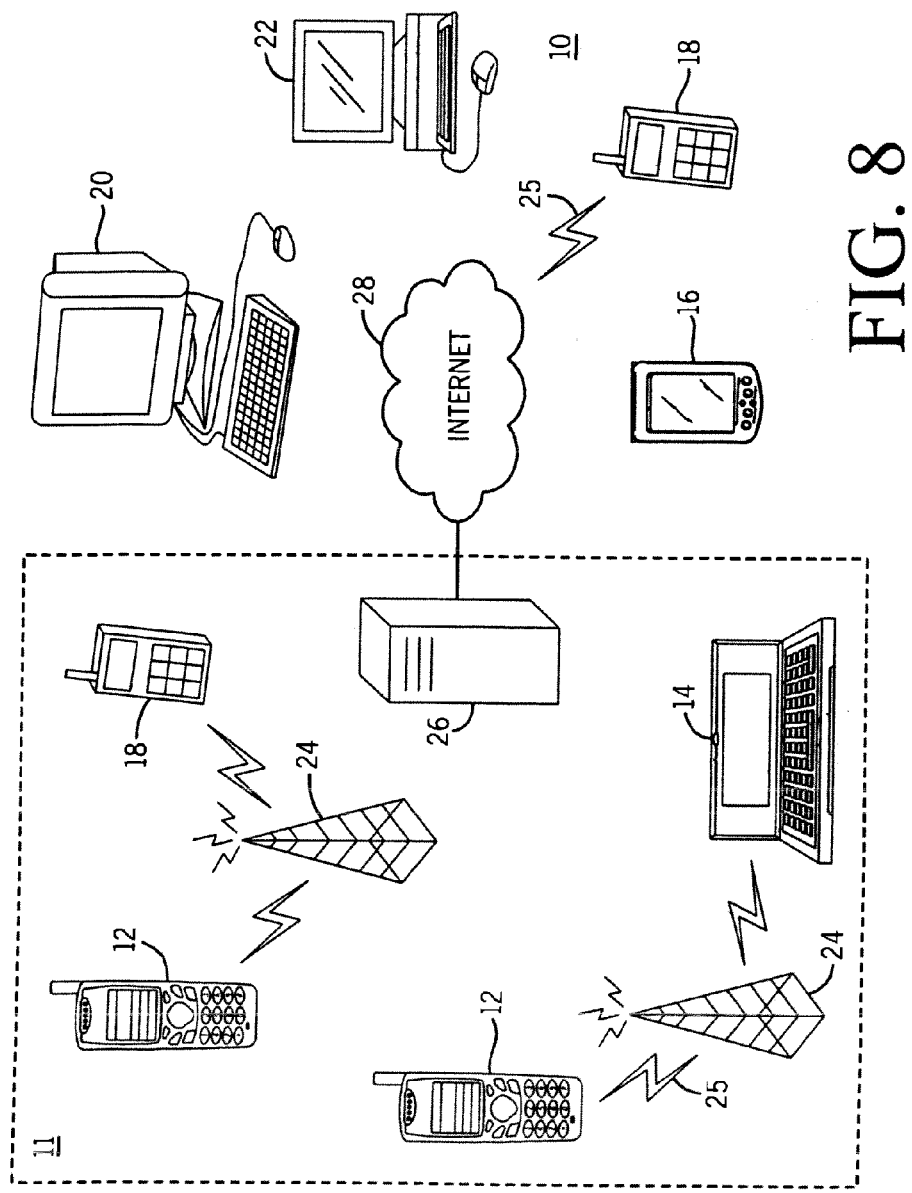
FIG. 8 is an overview diagram of a system within which the present invention may be implemented.

FIG. 8 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 8 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

Figure 9:
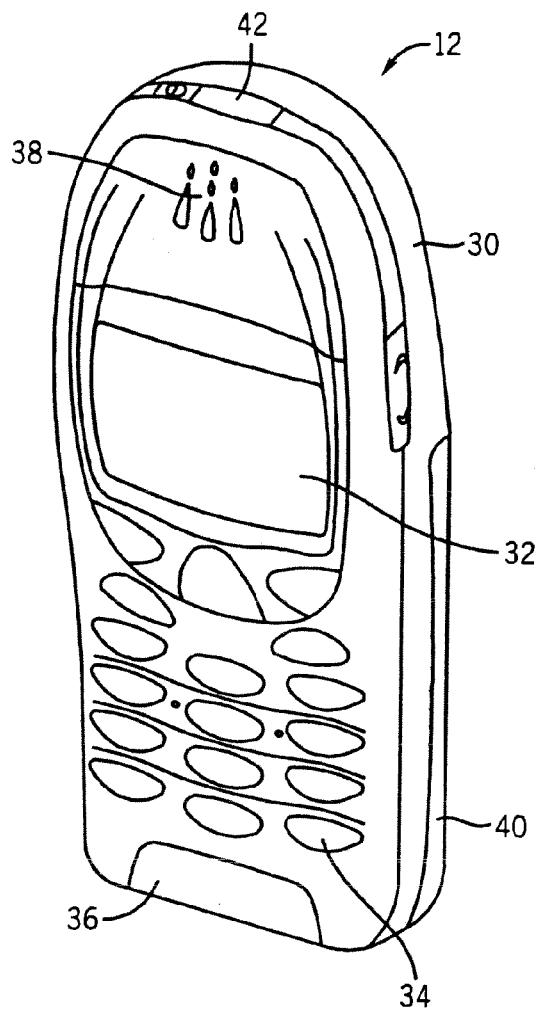
FIG. 9 is a perspective view of a mobile telephone that can be used in the implementation of the present invention.
Figure 10:
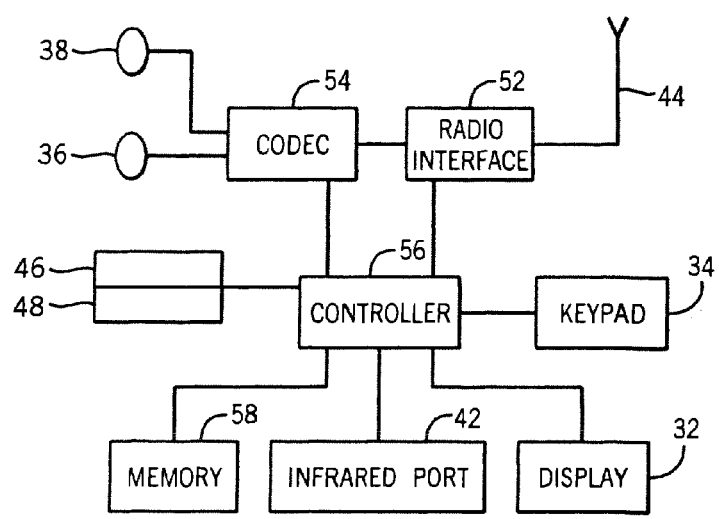
FIG. 10 is a schematic representation of the telephone circuitry of the mobile telephone of FIG. 9.

FIGS. 9 and 10 show one representative mobile telephone 12 within which the present invention may be implemented. It should be understood, however, that the present invention is not intended to be limited to one particular type of mobile telephone 12 or other electronic device. Other types of electronic devices that may be used include, but are not limited to, a PDA 16, a combination PDA and mobile telephone 14, an IMD 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc.

The mobile telephone 12 of FIGS. 9 and 10 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones. For exemplification, the system 10 shown in FIG. 8 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of deleting an item from a user account in a session initiation protocol (SIP) multimedia environment, comprising the following computer-implemented steps:
    receiving a request from a user device to delete the item from the user account, the request comprises a SIP REFER request including a unique identifier for the item to be deleted;
    establishing a SIP session between a remote recycle bin and the user account; and
    after establishing the SIP session, transferring the item from the user account to the remote recycle bin for automatic deletion without transfer of the item to a local recycle-bin.

2. The method of claim 1, wherein the SIP REFER request includes an address for the remote recycle bin in its Refer-to header.

3. A method of deleting at least one item from a user account in a session initiation protocol (SIP) multimedia environment, comprising:
    receiving a request from a user device to delete the at least one item from the user account, wherein the request comprises a SIP Multiple-REFER request;
    establishing a SIP session between a remote recycle bin and the user account; and
    after establishing the SIP session, transferring the item from the user account to the remote recycle bin for automatic deletion without transfer of the at least one item to a local recycle-bin.

4. The method of claim 1, further comprising, in response to receiving the request, transmitting an acknowledgment of the request to the user device.

5. The method of claim 1, wherein the SIP session is established with a session description protocol (SDP) directional attribute set to a=SendOnly.

6. The method of claim 1, wherein the SIP session is established with a session description protocol (SDP) directional attribute set to a=RecvOnly.

7. The method of claim 1, wherein the item includes a unique message identifier, and wherein the unique message identifier is included in the request from the user device.

8. The method of claim 1, wherein the request is to delete multiple items from the user account and wherein a uniform resource identifier (URI)-list of the multiple items is included in the request from the user device.

9. The method of claim 1, wherein the request is to delete all items from the user account and wherein a SIP uniform resource identifier (URI) for the user account is included in the request from the user account.

10. The method of claim 1, wherein the item is stored as a file having session description protocol (SDP) descriptions and wherein the file SDP descriptions are included in the request from the user device.

11. The method of claim 10 wherein the request is to delete multiple items from the user account and wherein file SDP descriptions for each of the multiple items is included in the request from the user device the file SDP descriptions for each file being included in a separate media line in the request.

12. The method of claim 1, wherein the user device, the user account and the remote recycle bin each possess a unique uniform resource identifier.

13. The method of claim 1, wherein message session relay protocol (MSRP) is used to transfer the item from the user account to the remote recycle bin.

14. A non-transitory computer-readable medium carrying one or more sequence of one or more instructions which, when executed by one or more processors, cause an apparatus to at least perform the following steps for deleting an item from a user account in a session initiation protocol (SIP) multimedia environment:
    receiving a request from a user device to delete the item from the user account wherein the request comprises an SIP REFER request including a unique identifier for the item to be deleted;
    establishing a session initiation protocol (SIP) session between a remote recycle bin and the user account; and
    after establishing the SIP session, transferring the item from the user account to the remote recycle bin for automatic deletion without transfer of the item to a local recycle-bin.

15. The computer-readable medium of claim 14, wherein the SIP REFER request includes an address for the remote recycle bin in its Refer-to header.

16. A non-transitory computer-readable medium carrying one or more sequence of one or more instructions which, when executed by one or more processors, cause an apparatus to at least perform the following steps for deleting at least one item from a user account in a session initiation protocol (SIP) multimedia environment:
    receiving a request from a user device to delete the at least one item from the user account, wherein the request comprises a SIP Multiple-REFER request;
    establishing a session initiation protocol (SIP) session between a network-based deleted items location and the user account; and
    after establishing the SIP session, transferring the at least one item from the user account to the remote recycle bin for automatic deletion without transfer of the at least one item to a local recycle-bin.

17. The computer-readable medium of claim 14, wherein the SIP session is established with a session description protocol (SDP) directional attribute set to a=SendOnly.

18. The computer-readable medium of claim 14, wherein the SIP session is established with a session description protocol (SDP) directional attribute set to a=RecvOnly.

19. The computer-readable medium of claim 14, wherein the item includes a unique message identifier, and wherein the unique message identifier is included in the request from the user device.

20. The computer-readable medium of claim 14, wherein the request is to delete multiple items from the user account and wherein a uniform resource identifier (URI)-list of the multiple items is included in the request from the user device.

21. The computer-readable medium of claim 14, wherein the request is to delete all items from the user account and wherein a SIP uniform resource identifier (URI) for the user account is included in the request from the user account.

22. The computer-readable medium of claim 14, wherein the item is stored as a file having session description protocol (SDP) descriptions and wherein the SDP descriptions are included in the request from the user device.

23. The computer-readable medium of claim 21, wherein the request is to delete multiple items from the user account and wherein file session description protocol (SDP) descriptions for each of the multiple items is included in the request from the user device the file SDP descriptions for each file being included in a separate media line in the request.

24. The computer-readable medium of claim 14, wherein the user device, the user account and the remote recycle bin each possess a unique uniform resource identifier.

25. The computer-readable medium of claim 14, wherein message session relay protocol (MSRP) is used to transfer the item from the user account to the remote recycle bin.

26. An electronic device, comprising:
    a processor; and
    a memory unit communicatively connected to the processor and including:
        computer code for receiving a session initiation protocol (SIP) request from a user device to delete an item from a user account, wherein the request comprises an SIP REFER request including a unique identifier for the item to be deleted;
        computer code for establishing a SIP session between a remote recycle bin and the user account; and
        computer code for, after establishing the SIP session, transferring the item from the user account to the remote recycle bin for automatic deletion without transfer of the item to a local recycle-bin.

27. The electronic device of claim 26, wherein the SIP REFER request includes an address for the remote recycle bin in its Refer-to header.

28. An electronic device, comprising:
    a processor; and
    a memory unit communicatively connected to the processor and including:
        computer code for receiving a session initiation protocol (SIP) request from a user device to delete at least one item from a user account, wherein the request comprises a SIP Multiple-REFER request;
        computer code for establishing a SIP session between a network-based deleted items location and the user account; and
        computer code for, after establishing the SIP session, transferring the at least one item from the user account to the remote recycle bin for automatic deletion without transfer of the at least one item to a local recycle-bin.

29. The electronic device of claim 26, wherein the SIP session is established with a session description protocol (SDP) directional attribute set to a=SendOnly.

30. The electronic device of claim 26, wherein the SIP session is established with a SDP session description protocol (SDP) directional attribute set to a=RecvOnly.

31. The electronic device of claim 26, wherein the item includes a unique message identifier, and wherein the unique message identifier is included in the request from the user device.

32. The electronic device of claim 26, wherein the request is to delete multiple items from the user account and wherein a uniform resource identifier (URI)-list of the multiple items is included in the request from the user device.

33. The electronic device of claim 26, wherein the request is to delete all items form the user account and wherein a SIP uniform resource identifier (URI) for the user account is included in the request from the user device.

34. The electronic device of claim 26, wherein the item is stored as a file having SDP session description protocol (SDP) descriptions and wherein the file SDP descriptions are included in the request from the user device.

35. The electronic device of claim 34, wherein the request is to delete multiple items from the user account and wherein file SDP descriptions for each of the multiple items is included in the request from the user device, the file SDP descriptions for each file being included in a separate media line in the request.

36. The electronic device of claim 26, wherein message session relay protocol (MSRP) is used to transfer the item from the user account to the remote recycle bin.

37. A method of deleting an item from a user account in a session initiation protocol (SIP) multimedia environment, comprising the following computer-implemented steps:
    transmitting a request from a user device to delete the item from the user account wherein the request comprises a SIP REFER request including a unique identifier for the item to be deleted;
    in response to the transmitted request establishing a SIP session between a virtual user agent and a remote recycle bin; and
    after establishing the SIP session, transferring the item from the user account to the remote recycle bin for automatic deletion without transfer of the item to a local recycle-bin.

38. The method of claim 37, wherein the SIP session is established with a session description protocol (SDP) directional attribute set to a=SendOnly.

39. The method of claim 37, wherein the SIP session is established with a session description protocol (SDP) directional attribute set to a=RecvOnly.

40. The method of claim 37, wherein the request is to delete multiple items, the request comprising a SIP Multiple-REFER request including a uniform resource identifier (URI) list of the items to be deleted.

41. The method of claim 37, wherein the request is to delete all items, the request comprising a SIP REFER request including a SIP uniform resource identifier (URI) for the user account.

42. The method of claim 37, wherein the item is stored as a file having session description protocol (SDP) descriptions and wherein the request comprises a REFER request including the SDP descriptions.

43. The method of claim 37, wherein items are stored as files having session description protocol (SDP) descriptions, wherein the request is to delete multiple items and wherein the file SDP descriptions of the items to be deleted are included in the request from the user device, the file SDP descriptions for each file being included in a separate media line in the request.

44. The method of claim 37, wherein the SIP REFER request includes an address for the remote recycle bin in its Refer-to header.

45. The method of claim 37, wherein message session relay protocol (MSRP) is used to transfer the item from the user account to the remote recycle bin.

46. A method of deleting an item from a user account in a session initiation protocol (SIP) multimedia environment, comprising the following computer-implemented steps:
    transmitting a SIP REFER request from a user device to delete the item from the user account, the SIP REFER request including an address for a remote recycle bin in its Refer-to header and unique identifier for the item to be deleted, wherein the item is transferred to the remote recycle bin for automatic deletion without transfer of the item to a local recycle-bin; and
    in response to receiving the SIP REFER request, transmitting an acknowledgment of the request to the user device.

* * * * *